(12) United States Patent  
Piersol et al.

(10) Patent No.: US 7,239,406 B1
(45) Date of Patent: Jul. 3, 2007

(54) SYSTEM FOR CAPTURING FACSIMILE DATA IN AN ELECTRONIC DOCUMENT MANAGEMENT SYSTEM

(75) Inventors: Kurt W. Piersol, Campbell, CA (US); Tatsuo Ito, Kanagawa (JP); Hirosuke Kainuma, Kanagawa (JP)

(73) Assignee: Ricoh Co., LTD, Tokyo (JP)

( * ) Notice: Subject to any disclaimer, the term of this patent is extended or adjusted under 35 U.S.C. 154(b) by 0 days.

(21) Appl. No.: 09/439,152

(22) Filed: Nov. 12, 1999

Related U.S. Application Data (63) Continuation-in-part of application No. 09/410,364, filed on Sep. 30, 1999, now Pat. No. 6,978,297.

(51) Int. Cl.
 *G06F 3/12* (2006.01)
 *G06F 15/00* (2006.01)
(52) U.S. Cl. ............... 358/1.15; 358/1.13; 358/468; 358/407
(58) Field of Classification Search ........... 358/1.15, 358/1.13, 1.16, 1.17, 1.1, 400, 401, 402, 358/403, 404, 407, 442, 444, 468; 707/1, 707/10, 102, 104.1, 204
 See application file for complete search history.

(56) References Cited

U.S. PATENT DOCUMENTS

| | | | |
|---|---|---|---|
| 5,095,373 A | * | 3/1992 | Hisano ................ 358/402 |
| 5,163,088 A | | 11/1992 | LoCascio |
| 5,222,234 A | | 6/1993 | Wang et al. |
| 5,572,583 A | | 11/1996 | Wheeler, Jr. et al. |
| 5,608,874 A | | 3/1997 | Ogawa et al. |
| 5,708,810 A | | 1/1998 | Kern et al. |
| 5,742,816 A | | 4/1998 | Barr et al. |
| 5,749,083 A | | 5/1998 | Koda et al. |
| 5,793,498 A | | 8/1998 | Scholl et al. |
| 5,819,273 A | | 10/1998 | Vora et al. |
| 5,845,304 A | | 12/1998 | Iijima |

(Continued)

FOREIGN PATENT DOCUMENTS

DE  44 11 244 AQ  10/1995

(Continued)

OTHER PUBLICATIONS

Database WPI, Sectino EI, Week 200019, Derwent Publications, Ltd., London, GB; AN 2000-219955, XP002208484 & KR 99 015 263 A. (Korea Electronic & Telecom Res Inst), Mar. 5, 1999, abstract.

*Primary Examiner*—D Popovici
(74) *Attorney, Agent, or Firm*—Blakely, Sokoloff, Taylor & Zafman LLP (57) ABSTRACT

A facsimile capture device is provided that functions in a plurality of operating modes. In a first automatic operating mode, the facsimile device captures received facsimile or "document" data without user intervention, and subsequently transmits the data to a device represented by a capture address. In one embodiment, the data is transmitted to a file management appliance ("FMA") which utilizes multiple processes and queues to provide document capture and indexing services to a network. In a second manual operating mode, the facsimile device selectively captures and modifies received document data based upon additionally received external input data. The facsimile device is capable transmitting the document data to a plurality of secondary devices utilizing various transmission and encapsulation protocols. In one embodiment, the facsimile device transmits captured document data to indexing and archiving devices according to standard Internet protocols.

25 Claims, 9 Drawing Sheets

U.S. PATENT DOCUMENTS

| | | |
|---|---|---|
| 5,848,410 A | 12/1998 | Walls et al. |
| 5,861,959 A | 1/1999 | Barak |
| 5,870,549 A | 2/1999 | Bobo, II |
| 5,880,855 A | 3/1999 | Ishikawa |
| 5,905,980 A | 5/1999 | Masuichi et al. |
| 5,907,837 A | 5/1999 | Ferrel et al. |
| 5,916,307 A | 6/1999 | Piskiel et al. |
| 5,923,826 A | 7/1999 | Grzenda et al. |
| 5,923,845 A | 7/1999 | Kamiya et al. |
| 5,946,701 A | 8/1999 | Hamada |
| 5,974,234 A | 10/1999 | Levine et al. |
| 5,978,477 A | 11/1999 | Hull et al. |
| 5,999,964 A | 12/1999 | Murakata et al. |
| 6,047,391 A | 4/2000 | Younis et al. |
| 6,058,437 A | 5/2000 | Park et al. |
| 6,147,774 A * | 11/2000 | Hamadani et al. .......... 358/442 |
| 6,288,790 B1 | 9/2001 | Yellepeddy et al. |
| 6,373,585 B1 | 4/2002 | Mastie et al. |

FOREIGN PATENT DOCUMENTS

| | | |
|---|---|---|
| EP | 0 446 149 A1 | 9/1991 |
| EP | 0 679 012 A2 | 10/1995 |
| FR | 2 646 539 | 11/1990 |

\* cited by examiner

FIG. 1

|  | Attribute Name | Meaning |
|---|---|---|
| 210 | FMA ID | Identifier for the FMA which identifier is unique in the world |
| 220 | Serial number | Unique identifier for the document on the NOA |
|  | Document name | The name of the document somehow defined |
| 230 | Document owner | The user/group who currently owns the copy |
| 240 | Document capturer | The user/group who captured the document |
| 245 | Capture device type | The type of device from which the document was captured |
| 245 | Capture device name | The name of device from which the document was captured |
|  | Transport direction | Whether or not the document was incoming, outgoing, with no direction, or with both directions when it was captured. |
| 250 | Capture date | The date when the document was archived |
|  | Creation date | The date when the document was captured by a capturing NOA or the last date it was modified on a PC |
|  | Last read on | The last date when the copy was read |
|  | Location | The location on main disk/backup |
| 290 | Backed Up | The identifier tells whether the document has been backed up and the backup medium where it is |
|  | Public | Whether or not the document is public |
| 280 | Indexed | Whether or not the document is indexed |
|  | Total pages | The number of total pages of the document if known |
| 270 | Compressed | Whether or not the document has been processed by the compression daemon |
| 260 | OCRed | Whether or not the document has been OCR'ed |
|  | Return receipt to | The URL to which the receipt is to be returned after indexing |
|  | Fax number | The fax number of the other party in case that the document is a fax document |
|  | Mail from | The ?from? header address in case that the document is an e-mail |
|  | Mail to | The ?to? header address(es) in case that the document is an e-mail |
|  | File to index | The name of the file to be indexed |
|  | Thumbnail | The name of the thumbnail file |
|  | Copy of | The serial number of the original document if it is copied after indexed, the serial number of the document itself otherwise |

FIG. 2

|  | Attribute Name | Value Type |
|---|---|---|
| 310 | FMA ID | Decimal numerical string that represents a positive integer |
| 320 | Serial number | Decimal numerical string that represents a positive integer |
|  | Document name | Any Character Data |
| 330 | Document owner | String that represents the name of registered user/group; or a comma-separated list of users and/or groups |
| 340 | Document capturer | String that represents the name of registered user/group |
| 345 | Capture device type | String that represents the type of capturing NOA; Choice of "Copier" "Fax" "Printer" "email" and "PC" |
|  | Capture device name | String that represents the network name of capturing NOA |
|  | Transport direction | One of "in" "out" "no" and "both" |
| 350 | Capture date | String that represents a UNIX date typically in the format of "YYYYMMDDhhmmss" where the time zone is GMT |
|  | Creation date | String that represents a UNIX date typically in the format of "YYYYMMDDhhmmss" where the time zone is GMT |
|  | Last read on | String that represents a UNIX date typically in the format of "YYYYMMDDhhmmss" where the time zone is GMT |
|  | Location | String that represents a pathname of the directory |
| 390 | Backed Up | Decimal numerical string that represents a nonnegative integer; 0 means the document has not been backed up other number means the identifier of the backup medium |
|  | Public | Boolean string, that is one of "true" and "false" |
| 380 | Indexed | Boolean string, that is one of "true" and "false" |
|  | Total pages | Decimal numerical string that represents nonnegative integer; 0 mean the number of total pages is unknown other number means the number of total pages |
| 370 | Compressed | Boolean string |
| 360 | OCRed | Boolean string |
|  | Return receipt to | String that represents a URL |
|  | Fax number | Decimal numerical string |
|  | Mail from | String that represents an e-mail address |
|  | Mail to | String that represents an e-mail address |
|  | File to index | String that represents a file name without a directory |
|  | Thumbnail | Same as File to index |
|  | Copy of | Same as Serial number |

FIG. 3

```
<NOA_metadata
    <doc
```
410 — `<item name="FMA ID" value="2361738294" /`

420 — `<item name="serial number" value="883639" /`

430 — `<item name="document owner" value="jones" /`

440 — `<item name="document capturer" value="jones" /`

450 — `<item name="capture date" value="03/29/98 01:17:45 GMT" /`

460 — `<item name="OCRed" value="true" /`

470 — `<item name="compressed" value="true" /`

480 — `<item name="indexed" value="true" /`

490 — `<item name="backed up" value="37" /`
```
    </doc>
</NOA_metadata>
```

SYSTEM FOR CAPTURING FACSIMILE DATA IN AN ELECTRONIC DOCUMENT MANAGEMENT SYSTEM

This nonprovisional application is a continuation-in-part of nonprovisional application Ser. No. 09/410,364 filed Sep. 30, 1999 now U.S. Pat. No. 6,978,297 and entitled "Method And Apparatus For Electronic Document Management."

FIELD OF THE INVENTION

The present invention relates generally to data processing; more specifically, the present invention relates to a system for capturing facsimile data in an electronic document management system.

BACKGROUND OF THE INVENTION

Document management systems, whether paper-based or electronic, are only as reliable as the information contained within the systems. If, for example, a given document is not catalogued or indexed into a document management system, the document will most likely not be found through a search or query of the corresponding document database. To the unsuspecting user who performs the search, it would appear as though the document does not exist, where in fact, someone simply may have not taken the time to "capture" or enter the document into the system.

Various electronic devices known in the art are capable of receiving document data for inclusion within an electronic document management system. Facsimile machines represent one such class of electronic devices and are typically capable of receiving both paper-based and electronic data. Conventional facsimile machines (sometimes referred to as "G3fax" devices) typically receive paper-based data through a scanning interface that converts ("digitizes") the data to an electronic format, and receive (as well as transmit) electronic data through a modem interface. A modem interface functions to modulate digital data for transmission across the publicly switched telephone network (PSTN), and demodulate data received over such a telephone network. Some facsimile devices, known as Internet fax devices or "Ifax" devices, are further capable of transmitting and receiving data over networks such as the Internet, using standard Internet protocols without the need to modulate or demodulate data. Additional information with respect to Internet facsimile devices may be found in (request for comments "RFC" numbers 2305, 2532, and 2542 available at http://www.rfc-editor.org)).

Facsimile machines known in the art (whether G3 or Internet facsimile devices) often require a significant amount of user-attention when transmitting facsimile documents, not to mention when processing electronic document data for inclusion within a document database. It is therefore desirable to have a facsimile system that processes electronic document data for inclusion within an electronic document database, with reduced, or even minimal, user intervention.

SUMMARY OF THE INVENTION

A method and apparatus for capturing facsimile data are described. In embodiment, the method includes processing data corresponding to a facsimile transmission with a facsimile device coupled to a network and determining an operating mode of the facsimile device, if the facsimile device is operating according to a first automatic mode of operation, then automatically sending over the network, by facsimile, the data corresponding to the facsimile transmission with captured metadata to automatically capture the facsimile transmission. If the facsimile transmission is operating according to a second manual mode of operation, then automatically sending over the network, by facsimile, data corresponding to the facsimile transmission with metadata selectively captured and optically modified based upon received external input data.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 2 is a table illustrating a first embodiment of an FMA metadata file format.

FIG. 3 is a table illustrating a second embodiment of an FMA metadata file format.

DETAILED DESCRIPTION

A system for capturing facsimile data in an electronic document management system is disclosed. In the following description, for purposes of explanation, numerous specific details are set forth in order to provide a thorough understanding of the present invention. It will be apparent, however to one skilled in the art that the present invention can be practiced without these specific details. In other instances, well-known structures and devices are shown in block diagram form to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for the reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMS, magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, although the present invention may be described with reference to a particular programming language, it will be appreciated that a variety of programming languages may be used to implement the teachings of the invention as described herein.

Although all or some of the operations may be performed by software executing on one or more processing devices (e.g., CPUs), on a computer system or specialized apparatus, some or all of these operations may be performed by digital logic and/or circuitry, an integrated circuit (e.g., ASIC) or other semiconductor substrates.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

System Overview

A system for capturing facsimile data in an electronic document management system is disclosed. A facsimile capture device is provided that functions in a plurality of operating modes. In a first automatic operating mode, the facsimile device captures received facsimile or "document" data without user intervention, and subsequently transmits the data to a device represented by a capture address. In one embodiment, the data is transmitted to a file management appliance ("FMA") which utilizes multiple processes and queues to provide document capture and indexing services to a network. In a second manual operating mode, the facsimile device selectively captures and modifies received document data based upon additionally received external input data. The facsimile device is capable transmitting the document data to a plurality of secondary devices utilizing various transmission and encapsulation protocols. In one embodiment, the facsimile device transmits captured document data to indexing and archiving devices according to standard Internet protocols.

Figure 1:
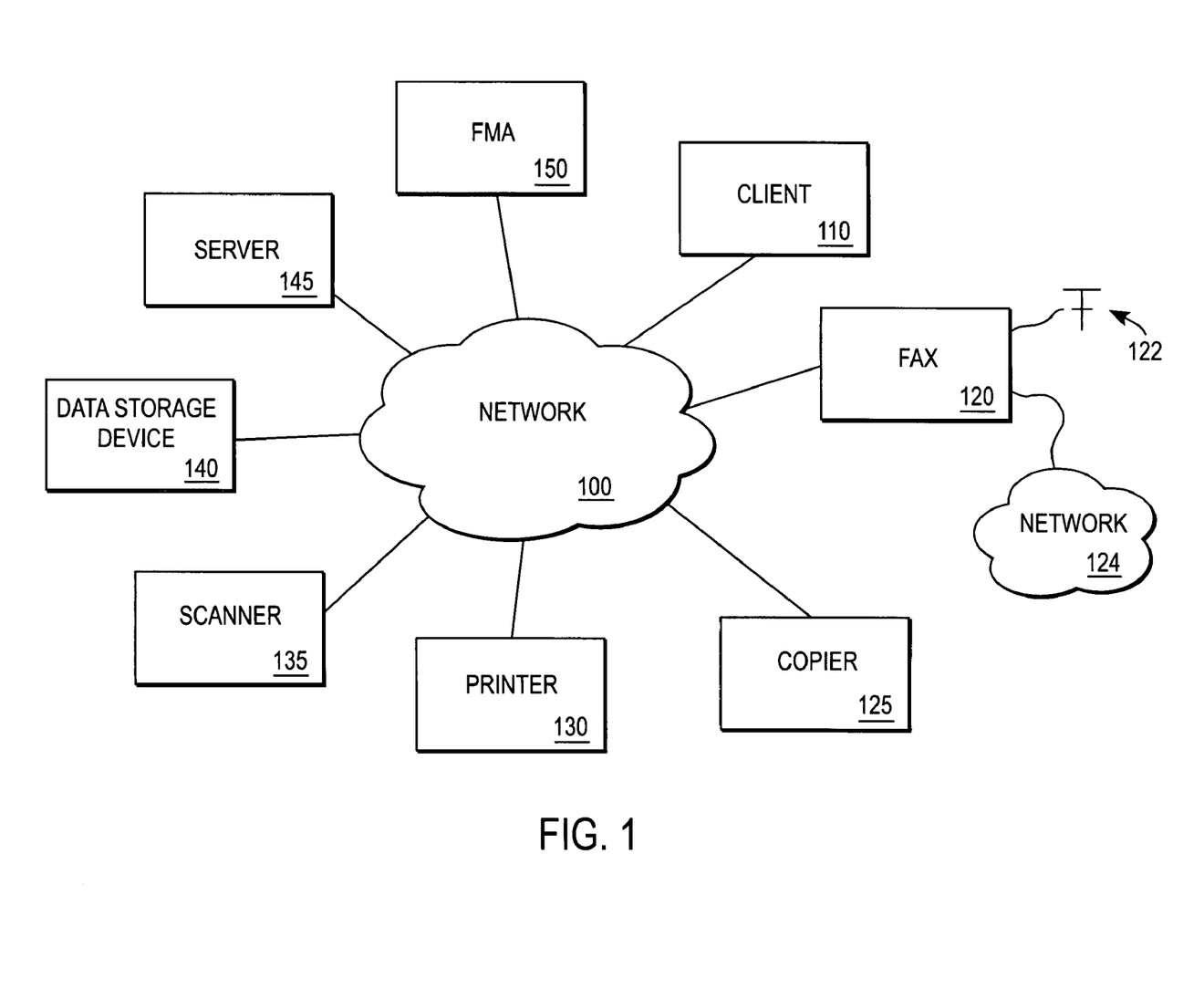
FIG. 1 illustrates one embodiment of a file management system.

FIG. 1 illustrates one embodiment of a file management system ("FMA"). Network 100 and network 124 may each represent a local area network (LAN), an intranet, the Internet, or any other interconnected data path across which multiple devices may communicate. Client 110 represents a general purpose digital computer connected to network 100. Also connected to network 100 is multimedia source 112, facsimile machine 120, copier 125, printer 130, scanner 135, data storage device 140, server 145, and FMA 150. In one embodiment, FMA 150 is equipped to index and archive data transmitted to and from one or more devices connected to network 100, including those devices shown in FIG. 1.

Multimedia source 112 represents one or more audio and video input devices connected to network 100. Multimedia source 112 may represent one or more microphones and/or video cameras that may provide both analog and digital data to network 100.

Facsimile machine 120 represents a device capable of transmitting and receiving data over a plurality of communications mediums including both voice and data networks. In one embodiment, facsimile machine 120 is a stand-alone device, whereas in an alternative embodiment, facsimile machine 120 may be implemented as an add-in expansion card for operation within another device such as client 110. In FIG. 1, facsimile machine 120 is shown as a stand-alone device connected to telephone network 122, and data networks 100 and 124. In one embodiment, telephone network 122 represents a voice network such as, for example, a publicly switched telephone network "PSTN" or a private branch exchange "PBX", whereas network 100 represents a local area data network, and network 124 represents the Internet. In one embodiment, facsimile machine 120 communicates over telephone network 122 by modulating and demodulating data through a device known as a MODEM. In one embodiment, facsimile machine 120 communicates over networks 100 and 124 using various Internet protocols including, for example, transmission control protocol/Internet protocol ("TCP/IP"), multipurpose Internet mail extensions ("MIME"), simple mail transfer protocol ("SMTP"), and so forth.

Copier 125 represents a device capable of reproducing text and images. In one embodiment, copier 125 is a photocopier that reproduces printed text and images, whereas in another embodiment copier 125 is a photocopier that reproduces data received from any number of devices connected to network 100.

Printer 130 represents a device capable of converting electronic data into printed text and images, whereas scanner 135 represents a device capable of converting printed text and images into electronic data. In one embodiment, facsimile machine 120, photocopier 125, printer 130, and scanner 135 are each separate and distinct devices connected to network 100. In another embodiment, a multifunction peripheral device may replace any combination of these devices. It should also be noted that any number of devices may be omitted from or added to network 100 without parting from the spirit and scope of the present invention.

In one embodiment, as shown by FIG. 1, data storage device 140 is also connected to network 100. In one embodiment, data storage device 140 represents a removable storage medium such as, for example, a CD-ROM, DVD-ROM, DVD-RAM, DVD-RW, or magnetic tape. In an alternative embodiment, data storage device 140 represents a non-removable storage medium such as a hard or fixed disk drive. Data storage device 140 may be a stand-alone device having a dedicated control unit, or data storage device 140 may be installed within and be controlled by another device such as, for example FMA 150. Server 145 represents a general purpose digital computer connected to network 100 and is configured to provide network services to other devices connected to network 100. In one embodiment, server 145 provides file sharing and printer services to network 100. In another embodiment, server 145 is a Web server that provides requested hypertext markup language (HTML) pages or files over network 100 to requesting devices.

FMA 150 is a file management appliance that is connected to network 100 and provides document capture, archiving, and indexing services to the network. FMA 150 may also provide configuration services to network 100 in addition to providing document capture, archiving, and indexing services. In one embodiment FMA 150 is equipped to publish its presence to other devices on network 100 using various protocols including the HTTP protocol.

Document capture (to be discussed more fully below) is the process by which one device requests an archiving device, such as data storage device 140, to archive a document. In one embodiment, FMA 150 is the requesting device, however, other devices such as facsimile machine 120 can also request archival of documents. Greater detail with respect to document capture is provided below and may also be found in U.S. Pat. No. 5,978,577 entitled "AUTOMATIC AND TRANSPARENT DOCUMENT ARCHIVING" filed Nov. 21, 1996, which is hereby incorporated by reference and is assigned to the corporate assignee of the present U.S. patent application.

In the FMA environment, a document may comprise a single file, or a document may comprise multiple distinct files of varying types, each representing at least the partial content of the document. A print job created on client 110 and intended for printer 130 could be captured, for example, as a thumbnail image, a postscript file, a portable document format (PDF) file, and an ASCII file containing extracted text. Additionally, FMA 150 is able to process multiple image file formats including the joint photographic experts group format (JPEG), graphics interchange format (GIF), and tagged image file format (TIFF) to name just a few. In one embodiment, each unique file type is represented by a corresponding unique file extension appended to the file's name. For example, a portable document format file may be represented as: filename.pdf, whereas a thumbnail image may be represented as: filename.thumb.

In one embodiment, FMA 150 is equipped to interpret compound filename extensions. For example, a file that contains thumbnail images in a tagged image file format may be represented as filename.thumb.tiff. In one embodiment, FMA 150 uses the page number of the document as the filename. In such a manner, a document may be represented by multiple files located in the same directory, each representing a different page of the document as reflected by the filename. For example, 01.thumb.jpg would represent a thumbnail image of page number one in joint photographic experts group format. Similarly, 12.thumb.tiff would represent a thumbnail image of page number twelve in tagged image file format.

FMA 150 may index data captured from various devices connected to network 100 including printer 130, facsimile machine 120, client 110, and scanner 135. In one embodiment, facsimile machine 120 captures data received over telephone network 122 and subsequently transmits at least part of the received data to FMA 150 over network 100. In another embodiment, facsimile machine 120 captures data received over a network, such as network 100 or 124, and transmits at least part of the received data over network 100 to FMA 150.

In one embodiment, facsimile machine 120 is capable of functioning in one of a plurality of selectable operating modes. In a first operating mode, facsimile machine 120 operates in an automatic capture mode wherein data received by facsimile machine 120 is automatically captured (e.g., captured without user intervention). In a second operating mode, facsimile machine 120 operates in a manual capture mode wherein data received by facsimile machine 120 is selectively captured based upon additionally received external input data. In one embodiment, the external input data is specified by a user through a data entry device coupled to, or included within facsimile machine 120. In one embodiment, if facsimile machine 120 does not capture the received data, facsimile machine 120 will nonetheless continue to function in a conventional manner by printing or transmitting the received data accordingly. If, however, the received data is captured by facsimile machine 120, at least a portion of the data is routed to a second device such as, for example, FMA 150. In one embodiment, FMA 150 receives bibliographic-type data, or "metadata" (discussed below) extracted from the captured document by facsimile machine 120.

The FMA capture process similarly applies to other devices connected to network 100 such as scanner 135 and copier 125. In one embodiment, if optical character recognition ("OCR") is performed on a scanned or copied document, FMA 150 creates two special OCR-related files. In one embodiment, contents.txt and contents.pdf are created and used by FMA 150 to index the full text of the document and return page images as a document file respectively.

Metadata

In one embodiment, each document captured within an FMA system is stored on the FMA as a separate UNIX directory that includes a metadata file. In one embodiment, the metadata file contains bibliographic data about the document such as, for example, creation time, creation date, last update time & date, ownership information including access and control attributes, and so forth. In one embodiment, document metadata consists of pairs of attribute names and their associated values.

FIG. 2 is a table illustrating one embodiment of an FMA metadata file. In FIG. 2, document metadata attributes are listed along with each attribute's meaning.

FIG. 3 is a table illustrating a second embodiment of an FMA metadata file. In FIG. 3, document metadata attributes are listed along with their acceptable value types.

Figure 4:
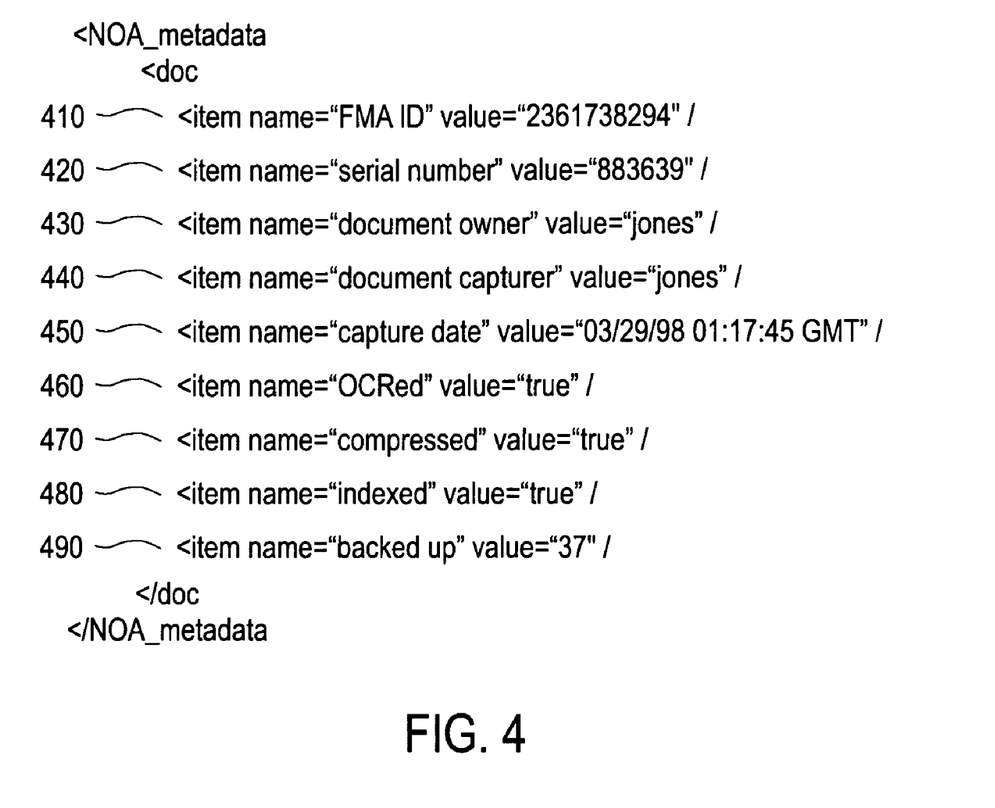
FIG. 4 illustrates one embodiment of an FMA metadata file in extensible markup language (XML) format.

FIG. 4 illustrates one embodiment of an FMA metadata file in extensible markup language (XML). The partial metadata code depicted in FIG. 4 is illustrative of what might be produced for a document that was captured by user "jones" (line 440), is owned by user "jones" (line 430), has serial number "883639" (line 420), and was backed up by a device (line 490). Furthermore, the metadata code shown in FIG. 4 shows that the document was processed by OCR and compression (lines 460 and 470), was indexed (line 480), and was backed up to disk 37 (line 490).

Document Capturing

Document capture is an operation in which a device (e.g., facsimile machine 120) requests an archiving device (e.g., data storage device 140) to archive a document. In one embodiment, document capture is automatically performed upon all documents received by the capturing device, whereas in another embodiment, only selected documents are captured by the capturing device in response to user input. For example, the user may press a button or series of buttons that prevents one or more documents from being automatically captured. In one embodiment, document capture utilizes standard Internet protocols enabling the capture of multiple documents, or multiple files associated with a single document.

In one embodiment, HTTP is used as the capture protocol. Using the HTTP POST operation, for example, files of various formats including archive formats, may be captured by the FMA. Such archived files may contain collections of distinct named data files or data blocks, and may comprise archive formats such as the tape archive (tar) format, the zip, gzip and pkzip formats, the StuffIt format, and the like.

In another embodiment, an implementation of the Internet File Transfer Protocol (FTP) is used as the capture protocol, whereby documents are captured either as MIME files in the default FTP directory, or as subdirectories of the default directory. The actual name of the document directory is not important during document capture since the name of the document is not stored as part of the directory system of the FMA, but is instead stored within the metadata file. In one embodiment, the document's capture date is used for the name of the document directory. In addition, a unique identifier, such as a serial number, may be assigned to each document and stored in the document's metadata file (shown in FIGS. 2, 3 and 4 as 220, 320, and 420 respectively).

Figure 5A:
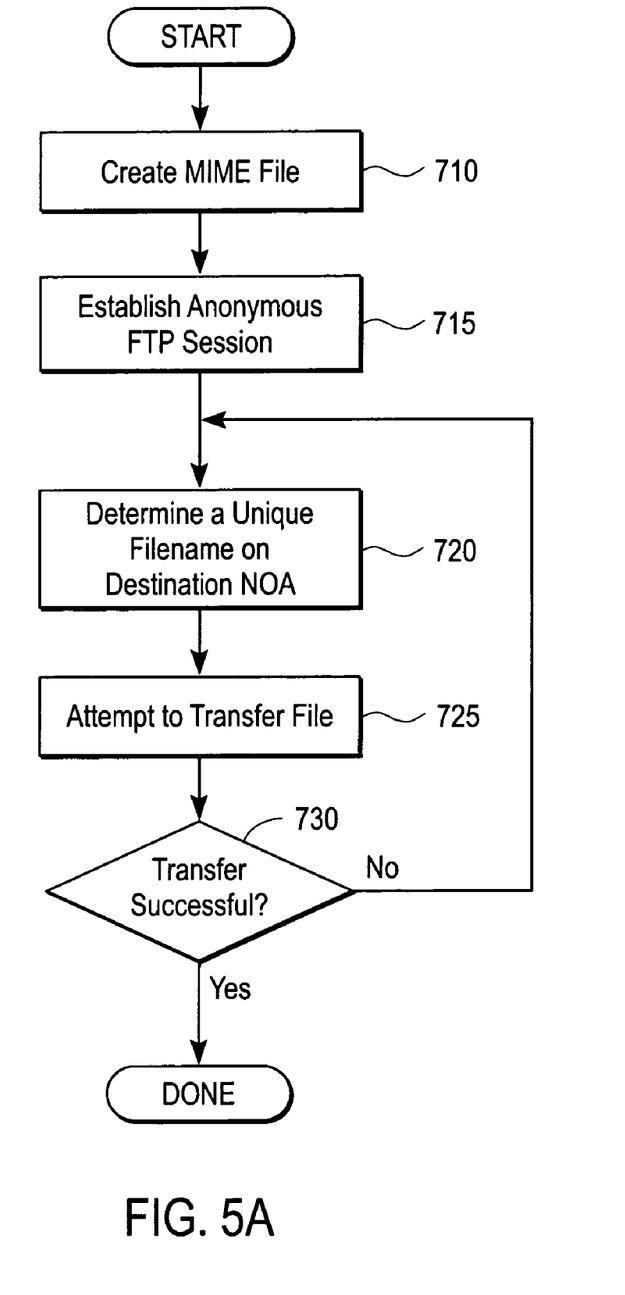
FIG. 5A is a flow diagram illustrating one embodiment of MIME capturing in an FMA environment.

FIG. 5A illustrates a flow diagram of one embodiment of MIME capturing used in one embodiment of an FMA environment. Referring to FIG. 5A, a capturing device creates a MIME multi-part file, including one or more content files and a metadata file (510). After creating the MIME file, the capturing device then attempts to establish an anonymous FTP session with a destination device (515). Once an FTP session is established, the capturing device determines a filename that is a unique on the destination device (520) and attempts to transfer the file to the destination device (525). If the transfer fails, the capturing device obtains a new filename and attempts the file transfer again. The capture is complete upon a successful file transfer (530).

Figure 5B:
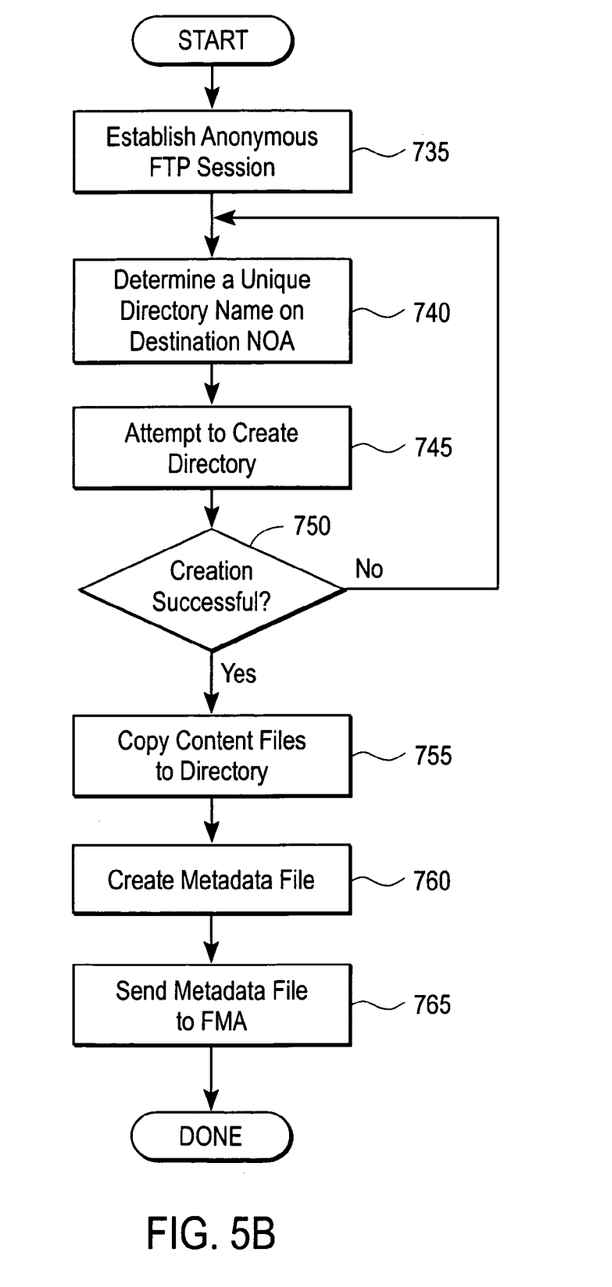
FIG. 5B is a flow diagram illustrating one embodiment of directory capturing in an FMA environment.

FIG. 5B illustrates a flow diagram of one embodiment of directory capturing in one embodiment of an FMA environment. Referring to FIG. 5B, the capturing device (e.g., facsimile machine 120) establishes an anonymous FTP session with the destination device (535). Once the FTP session is established, the capturing device determines what it assumes to be a unique directory name (to be more fully discussed below) on the destination device (540). Once a directory name is determined, the capturing device attempts to create a directory with that name on the destination device (545). If the attempt to create the directory is unsuccessful, whether due to a duplicate directory name or otherwise, the capturing device determines another directory name and attempts to create the directory again (550, 540 and 545). If, however, the capturing device successfully creates the directory on the destination device (550), the capturing device then copies the content file or files to the newly created directory (555). The capturing device also creates a metadata file (560) which is then sent to the FMA device (565) to complete the process.

Figure 5C:
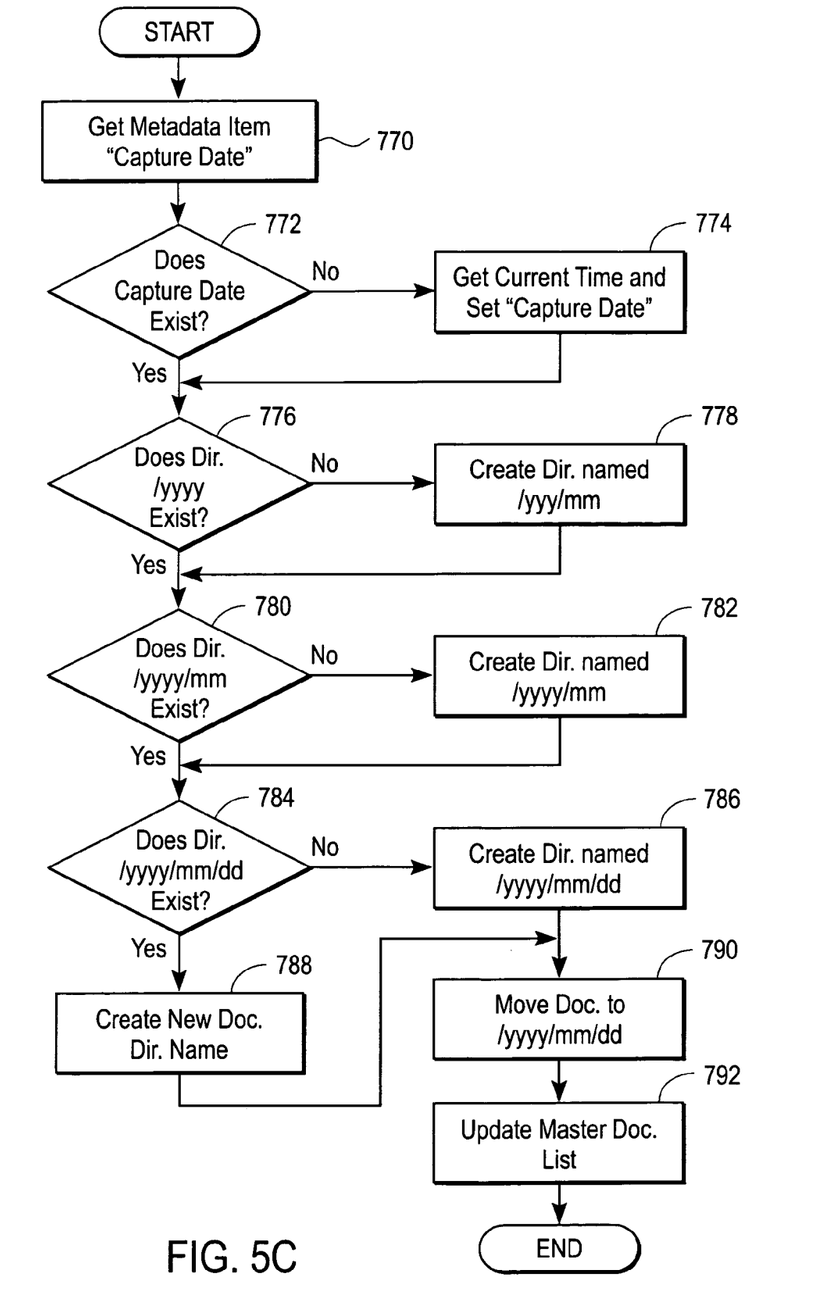
FIG. 5C is a flow diagram illustrating one embodiment of document storage in an FMA environment.

FIG. 5C illustrates a flow diagram of one embodiment of the document storage process in an FMA environment. During the document storage process, the FMA creates appropriate directories, moves the document to the appropriate directory, and updates the master list. Referring to FIG. 5C, the metadata file of the document to be stored is accessed and information from its "Capture date" field (see items 250 and 350 in FIGS. 2 and 3 respectively) is retrieved (570). If the document's "Capture date" or even the metadata file does not exist, then the current system time is obtained and used as the document's "Capture date" (574). If, however, the document's "Capture date" does exist, the system determines whether an appropriately named directory exists. In one embodiment the document directory is represented by "yyyy/mm/dd" where yyyy represents the year in which the document was created, mm represents the ordinal month in which the document was created, and dd represents the day of the month in which the document was created. Other date formats and/or storage ordering can also be used.

Referring once again to FIG. 5C, the system determines whether a directory exists as reflected by the appropriate four-digit year (576). If a directory reflecting the appropriate year does not exist, the system creates such a directory (578). If a directory reflecting the appropriate year does exist, however, the system then checks whether a directory reflecting the appropriate month exists within that year directory (580). If the appropriate month directory does not exist within the year directory, the system creates a month directory within the year directory (582). If the appropriate year and month directories exist, the system finally checks whether the appropriate day directory exists within the nested year/month directory (584). If the day directory does not exist, the system creates the appropriate day directory within the year/month directory (586). If, however, a directory reflecting the appropriate year, month and day already exists, the system creates a new document directory name into which the document will be stored. In one embodiment, the system generates a four-digit random number that gets appended to the end of the existing document directory name (588). Once a unique document directory name is established (586 and 588), the document is moved to that directory (590) and the master document list is updated to reflect the document's new location (592).

Document Ownership

In an FMA system, various access control or ownership properties may be individually or commonly assigned to documents to regulate user access to the documents. A document owner is usually considered to have the most freedom with respect to access and control of any given document. An owner of a document within an FMA system, for example, is permitted to perform various operations with respect to that document including, but not limited to, viewing the document, changing the ownership of the document, expunging the document, and copying the document to another owner. In one embodiment, due to the breadth of control an owner has over a particular document, file access within an FMA system is controlled under a "single owner" model of ownership. That is, every document contains an owner field that specifies which user or users are allowed to access or view the document. Under this model of ownership, owners may be designated as individual users or may be designated as groups of users. If a group is specified as the owner of a document, then every member of that group is treated as the owner of the file. Each document within the FMA system may be designated as a public document, in which ownership of the document is not changed, but all users are allowed to view the document. In one embodiment, the user and group name space used for ownership access is the same user and group name space used to provide HTTP authentication to the web server.

Facsimile Capturing

Figure 6:
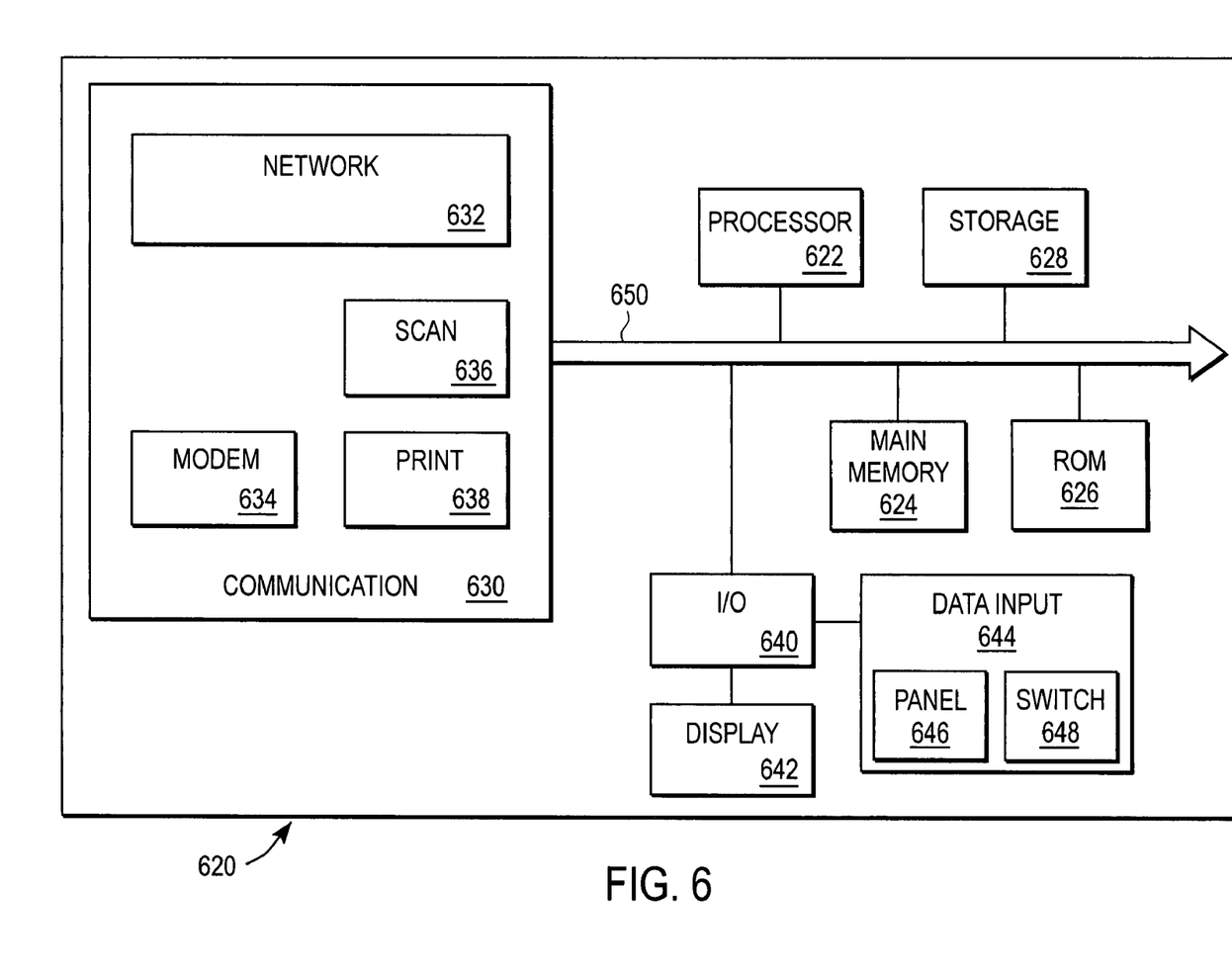
FIG. 6 is a block diagram illustrating one embodiment of a facsimile machine.

FIG. 6 is a block diagram of one embodiment of a facsimile machine. Referring to FIG. 6, facsimile machine 620 comprises shared bus 650 to communicate data between the various components within facsimile machine 620. Bus 650 may comprise a peripheral component interconnect bus or some other bus structure known in the art to communicate data. Processor 622 is coupled to bus 650 and processes data within facsimile machine 620. Although facsimile machine 620 is shown to contain a single processor 622, facsimile machine 620 may similarly contain multiple processors.

Facsimile machine 620 further comprises main memory 624 and read only memory (ROM) 626, both coupled to bus 650. In one embodiment, main memory 624 represents a dynamic storage device, such as, for example, random access memory (RAM), to store information and instructions to be executed by processor 622. Main memory 624 may also store temporary variables and other intermediate data during instruction execution. In one embodiment, read only memory 626 represents a static storage device to store static information and instructions for processor 622. Storage device 628 is coupled to bus 650 and represents a large capacity, non-volatile storage device such as, for example, a magnetic or optical disk to store information and instructions for varying lengths of time. In one embodiment, storage device 628 may store both received facsimile data and facsimile data to be transmitted by facsimile machine 620.

Facsimile machine 620 may also be coupled to input/output (I/O) unit 640 via bus 650. I/O unit 640 represents a general purpose input/output device that enables facsimile machine 620 to receive external input data and output display data. I/O device 640 may be coupled to any number of display devices, such as liquid crystal display 642. Similarly, I/O device 640 may be coupled to any number of data input devices, such as alphanumeric input panel 646, or mode selection switch 648. In one embodiment, mode selection switch 648 is operable to select between multiple capture modes including an automatic capture mode in which document data is captured without user intervention and a manual capture mode in which document data is selectively captured based upon external user input data received from alphanumeric input panel 646. In one embodiment, mode selection switch 648 is a mechanical switch, whereas in another embodiment, mode selection switch 648 may be a programmable multiplexor.

Facsimile machine 620 further comprises communications unit 630 which is coupled to bus 650 and includes network interface 632, modem interface 634, scanning interface 636, and printing interface 638. In one embodiment, network interface 632 enables facsimile machine 620 to communicate over networks 100 and 124 using multiple Internet and data transfer protocols including, for example, TCP/IP, MIME, SMTP, etc. Network interface 632 may be implemented as a network interface card, an application specific integrated circuit (ASIC), or in any other manner known in the art so as to provide network connectivity to facsimile machine 620. In an alternative embodiment, facsimile machine 620 may include multiple network interfaces for communicating across multiple networks simultaneously. Modem interface 634 represents a device to modulate data to be transmitted across an analog network, such as telephone network 122, and to demodulate data received from such a network. Facsimile machine 620 may comprise multiple modem interfaces for communicating over a corresponding number of analog networks simultaneously. Data received through both network interface 632 or modem interface 634 may be stored in storage device 628 for later transmission or printing.

Printing interface 638 prints paper-based or "hard-copy" versions of electronic data received by facsimile machine 120. The electronic data may have been received through modem interface 634, network interface 632, or may have been scanned into facsimile machine 620 through scanning interface 636. Scanning interface 636 is capable of converting or "digitizing" paper-based documents into electronic image data, which may then be transmitted to any number of devices connected to networks 100 or 124. Additionally, the digitized data may be transmitted across telephone network 122 after being modulated by modem interface 634. Scanning interface 636 may optionally include an optical character recognition module (not shown to avoid obscuring the present invention) that recognizes and converts the digitized electronic image data into machine editable text.

Figure 7:
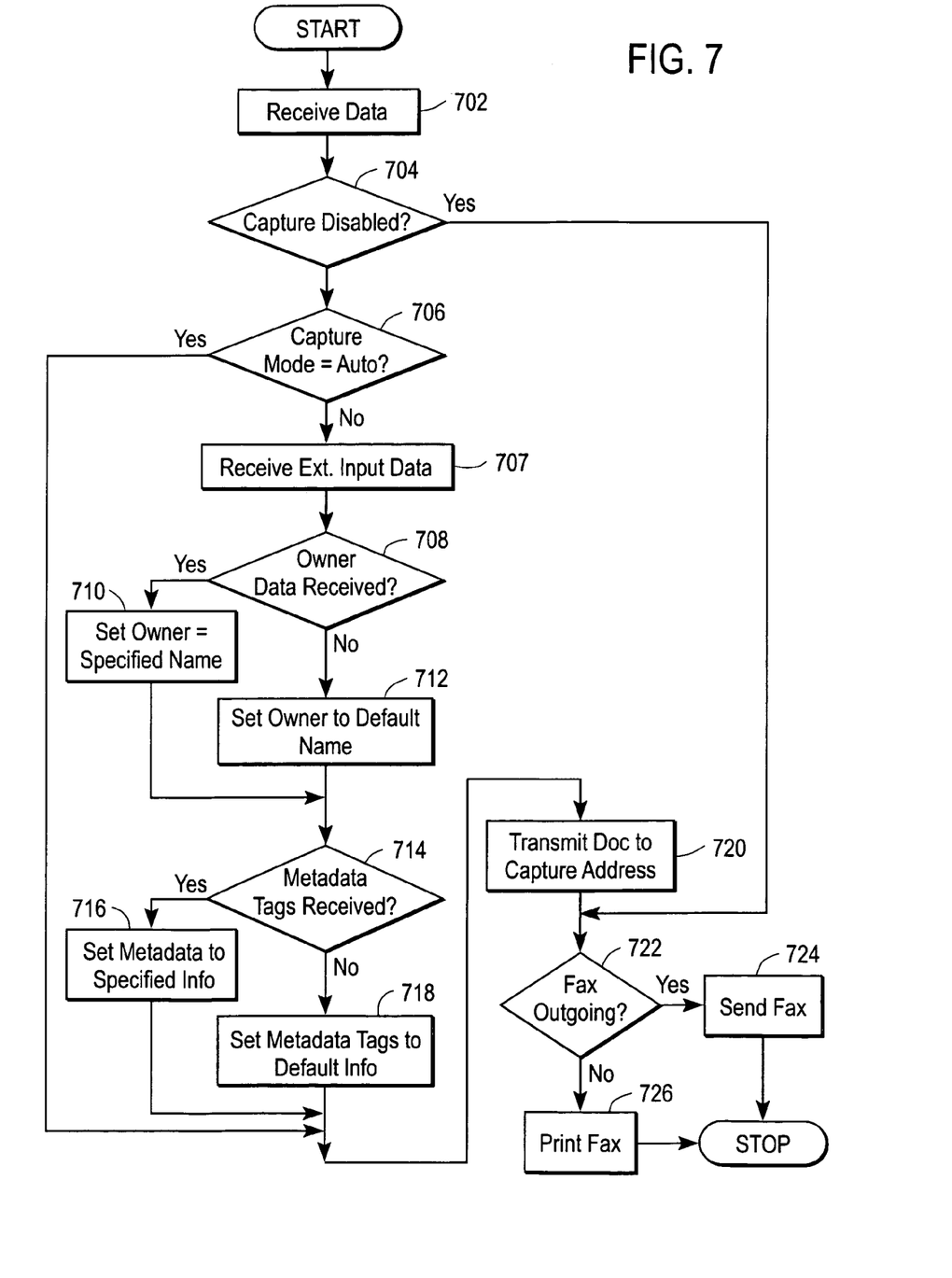
FIG. 7 is a flow diagram of one embodiment of a process for performing data capture on a facsimile machine.

FIG. 7 is a flow diagram of one embodiment of a process for performing data capture on a facsimile machine. Referring to FIG. 7, the process begins when a facsimile machine, such as facsimile machine 620, receives document data (processing block 702). In one embodiment, facsimile machine 620 receives the data through the scanning interface, whereas in other embodiments, facsimile machine 620 may receive data through various other communication interfaces such as, for example, modem interface 634, network interface 632, and I/O unit 640.

After document data is received, the operating mode of facsimile machine 620 is determined. It should be noted, however, that the operating mode may also be determined prior to facsimile machine 620 receiving the document data. In one embodiment, the operating mode of facsimile machine 620 is determined by facsimile machine 620 polling I/O unit 640 to detect the status of one or more switch settings or to detect alphanumeric input from a user. If it is determined that facsimile machine 620 is operating in a capture disabled mode (processing block 704), facsimile machine 620 continues to process the received data in a conventional manner. That is, facsimile machine 620 determines whether or not the received data is outgoing (e.g., designated to be transmitted to another device) (processing block 722). If the data is determined to be outgoing, the data is transmitted to a designated destination device (processing block 724). If the data is not outgoing, however, the data is deemed to be incoming and is therefore printed (processing block 726). After the data is transmitted or printed, facsimile machine 620 prepares to receive additional document data by transitioning to processing block 702.

If it is determined that facsimile machine 620 is operating in a capture enabled mode (processing block 704), a further determination is made as to whether facsimile machine 620 is operating in an automatic capture mode (processing block 706). If it is determined that facsimile machine 620 is operating according to an automatic capture mode, facsimile machine 620 captures the data without any additional user intervention (processing block 720).

In one embodiment, the automatic capture mode may be suspended or temporarily disabled to prevent facsimile machine 620 from capturing data for a limited period of time. In one embodiment, the automatic capture mode of facsimile machine 620 is suspended in response to external user input (e.g., a button or switch), whereas in another embodiment, data capture may be suspended based at least partially upon the content of the received data. For example, facsimile machine 620 may be set to operate in an automatic capture mode unless data is received from a particular user or device. Upon receiving data from such a designated user or device, facsimile machine 620 temporarily ceases capturing until, for example, additional data is received. In one embodiment, facsimile machine 620 may be set via a timing mechanism to operate in automatic capture mode for a limited amount of time before transitioning to a capture-disabled or a manual capture mode.

In one embodiment, the process of automatically capturing data on facsimile machine 620 includes various sub-processes, such as generating metadata and transmitting the generated metadata to one or more designated destination devices. In one embodiment, facsimile machine 620 generates metadata by extracting various data attributes from the received document. Such data attributes may be extracted from data headers within the document, as well as from the document content itself. In one embodiment, destination devices are designated by way of one or more capture addresses. A capture address may be an internet protocol (IP) address, one or more electronic mail addresses, an electronic mail distribution list address, or some other means that may be used to identify a destination device or node on a network. The capture addresses may be stored within facsimile machine 620, or they may be included within the received data.

In order to transmit data across various networks, it is often necessary to encapsulate the data according to some encapsulation protocol. Various such network data encapsulation protocols are known in the art, and may include for example, TCP/IP, MIME, SMTP, and so forth. In one embodiment, the metadata generated by facsimile machine 620 is encapsulated according to one of the various network encapsulation protocols prior to being transmitted to a capture address. In one embodiment, the protocol used to encapsulate the metadata is selected by facsimile machine 620 based upon the format and/or content of the capture address. For example, if the capture address represents an electronic mail address, facsimile machine 620 may encapsulate the data prior to transmission according to the MIME encapsulation protocol. One skilled in the art will recognize that multiple encapsulation protocols may be simultaneously utilized.

Referring once again to FIG. 7, while in an automatic mode of operation (processing block 706), the encapsulated metadata is transmitted to the destination device or node that is indicated by the capture address (processing block 720). In one embodiment, the metadata is transmitted over a network to an FMA device for indexing and/or archiving.

If facsimile machine 620 is not operating according to an automatic capture mode (processing block 706), but rather is operating according to a manual capture mode, external input data is received (processing block 707) and subsequently utilized to further process the received document data. The external input data may be user-specified external input data received by way of I/O unit 640. In one embodiment, the received external input data is utilized by facsimile machine 620 to determine whether or not the received document data should be captured. In another embodiment, the received external input data is utilized by facsimile machine 620 to assign and modify access control and ownership attributes of the received document data.

If facsimile machine 620 receives external input data specifying various ownership attributes of the document data, such as the name of the document owner for example (processing block 708), the appropriate attributes are set or modified accordingly in the metadata (processing block 710). If, however, external input data is not received, or external input data is received but does not include such ownership attributes, default ownership attributes stored within facsimile machine 620 are utilized (processing block 712). Likewise, if facsimile machine 620 receives external input data specifying various other metadata attributes or tags (processing block 714), facsimile machine 620 sets or modifies the document metadata to reflect the newly received attributes accordingly (processing block 716). In one embodiment, if no addition metadata attributes or tags are received by way of the external input data, default metadata attributes stored within facsimile machine 620 are utilized (processing block 718). Once the document data has been captured according to the given operating mode, facsimile machine 620 continues to operate as a conventional facsimile device by transmitting or printing the received data accordingly (described above).

Therefore, in one embodiment, if operating in automatic system mode, a copy of a facsimile transmission being sent or received by a facsimile machine on a network is automatically archived by being sent over the network to at least one specific address, along with (optionally) additional metadata associated with the facsimile transmission, in a manner transparent to an individual sending or receiving the transmission and as part of the transmission process. The archiving may be performed by having the facsimile transmission sent over the network to a device, such as an FMA, using an address prespecified for or identified by (e.g., extracted from the facsimile transmission) the facsimile machine sending or receiving the original facsimile transmission. The archiving over the network may be performed by using one of the well-known facsimile protocols, such as the internet faxing protocols, using the designated address(es).

Note that the processing performed herein is performed by processing logic, which may comprise hardware (e.g., dedicated logic, circuitry, etc.), software, or a combination of both.

Whereas many alterations and modifications of the present invention will no doubt become apparent to a person of ordinary skill in the art after having read the foregoing description, it is to be understood that any particular embodiment shown and described by way of illustration is no way intended to be considered limiting. Therefore, references to details of various embodiments are not intended to limit the scope of the claims which in themselves recite only those features regarded as essential to the invention.

What is claimed is:

1. A method comprising:
    processing data corresponding to a facsimile transmission with a facsimile device coupled to a network;
    determining an operating mode of the facsimile device;
    if the facsimile device is operating according to a first automatic mode of operation, then automatically capturing the data corresponding to the facsimile transmission into metadata and sending the captured metadata, over the network using a facsimile protocol of the network, to a predetermined address other than a destination of the facsimile transmission; and if the facsimile transmission is operating according to a second manual mode of operation, then automatically selectively capturing and optionally modifying the data corresponding to the facsimile transmission into the metadata based upon external input data and sending the captured metadata, over the network using a facsimile protocol of the network, to the predetermined address.

2. The method of claim 1, wherein processing the facsimile transmission comprises receiving the facsimile transmission through at least one of a scanning interface, a network interface, and a modem interface.

3. The method of claim 1, wherein automatically sending the facsimile transmission comprises:
generating, without user intervention, metadata representing attributes of the facsimile transmission;
encapsulating, without user intervention, the metadata according to one of a plurality of network encapsulation protocols; and
transmitting, without user intervention, the encapsulated metadata to a second device indicated by a capture address.

4. The method of claim 3, wherein the capture address includes at least one of a network address and an electronic mail address.

5. The method of claim 3, wherein transmitting the encapsulated metadata to a second device comprises transmitting the encapsulated metadata to an archiving device.

6. The method of claim 1, wherein the received external input data indicates to the facsimile device whether the facsimile device should capture the data corresponding to the facsimile transmission.

7. The method of claim 1, wherein the received external input data comprises user specified access control and ownership attributes for the data corresponding to the facsimile transmission.

8. The method of claim 1, wherein automatically sending data corresponding to the facsimile transmission with selectively captured and optically modified metadata comprises:
generating metadata based upon the content of the data corresponding to the facsimile transmission and the received external input data;
encapsulating the metadata according to one of a plurality of network transfer protocols; and
transmitting the encapsulated metadata to a second device indicated by a capture address.

9. The method of claim 8, wherein the at least one capture address includes at least one of a network address and an electronic mail address.

10. The method of claim 8, wherein transmitting the encapsulated metadata to a second device comprises transmitting the encapsulated metadata to an archiving device.

11. The method of claim 8, wherein the metadata is encapsulated according to the Internet fax protocol.

12. A machine readable medium having stored thereon a plurality of instructions that, when executed by one or more processors, cause the one or more processors to perform the method of:
processing data corresponding to a facsimile transmission with a facsimile device coupled to a network;
determining an operating mode of the facsimile device;
if the facsimile device is operating according to a first automatic mode of operation, then automatically capturing the data corresponding to the facsimile transmission into metadata and sending the captured metadata, over the network using a facsimile protocol of the network, to a predetermined address other than a destination of the facsimile transmission; and
if the facsimile transmission is operating according to a second manual mode of operation, then automatically selectively capturing and optionally modifying the data corresponding to the facsimile transmission into the metadata based upon external input data and sending the captured metadata, over the network using a facsimile protocol of the network, to the predetermined address.

13. The machine readable medium of claim 12, wherein automatically sending the facsimile transmission comprises:
generating, without user intervention, metadata representing attributes of the facsimile transmission;
encapsulating, without user intervention, the metadata according to one of a plurality of network encapsulation protocols; and
transmitting, without user intervention, the encapsulated metadata to a second device indicated by a capture address.

14. The machine readable medium of claim 12, wherein the received external input data indicates to the facsimile device whether the facsimile device should capture the data corresponding to the facsimile transmission.

15. The machine readable medium of claim 12, wherein the received external input data comprises user specified access control and ownership attributes for the data corresponding to the facsimile transmission.

16. The machine readable medium of claim 12, wherein automatically sending data corresponding to the facsimile transmission with selectively captured and optically modified metadata comprises:
generating metadata based upon the content of the data corresponding to the facsimile transmission and the received external input data;
encapsulating the metadata according to one of a plurality of network encapsulation protocols; and
transmitting the encapsulated metadata to a second device indicated by a capture address.

17. A facsimile device comprising:
receiving means for receiving data corresponding to a facsimile transmission;
switching means for selecting between one of a plurality of capture modes, including an automatic capture mode in which the data corresponding to the facsimile transmission is captured without user intervention, and a manual capture mode in which the data corresponding to the facsimile transmission is selectively captured based upon external user input data;
capturing means for automatically or manually capturing the received data corresponding to the facsimile transmission based upon the selected capture mode; and
transmission means for transmitting the captured data corresponding to the facsimile transmission to a second device for archiving thereby.

18. The facsimile device of claim 17, wherein the receiving means comprises at least one a scanning interface means, a network interface means, and a modem interface means.

19. The facsimile device of claim 17, wherein the transmission means comprises at least one of a network interface means, and a modem interface means.

20. A network comprising:
a facsimile device having a plurality of selectable capture modes to capture electronic documents and transmit the captured electronic documents across the network transparently as part of performing a facsimile transmission or reception of the electronic documents, wherein the facsimile device further comprises a first automatic capture mode to capture the electronic documents without user intervention, and a second manual capture mode to selectively capture the electronic documents based upon received external input data; and an archiving device to receive and store the captured electronic documents.

21. A method comprising:

processing a facsimile transmission of a document; and automatically capturing and archiving the facsimile transmission and optionally specified metadata without user intervention, in a first mode of operation when enabled, by sending the facsimile transmission over a network, wherein contents of the optionally specified metadata are automatically selected, manually selected based on user input, or both.

22. The method of claim 21 wherein the metadata comprises one selected from a group consisting of an owner of the document, a default name associated with the document, information input by the user, an indication of allowable access to the document, a topic indication, a document tag and bibliographic data.

23. The method of claim 21 wherein processing the facsimile transmission comprises sending or printing the document.

24. The method defined in claim 22 further comprising modifying data of the facsimile transmission based on user input.

25. A machine readable medium having stored thereon a plurality of instructions that, when executed by one or more processors, cause the one or more processors to perform the method of:

processing a facsimile transmission of a document; and automatically capturing and archiving of facsimile transmission and optionally specified metadata without user intervention, in a first mode of operation when enabled, by sending the facsimile transmission over a network, wherein contents of the optionally specified metadata are automatically selected, manually selected based on user input, or both.

* * * * *